2,949,481
Patented Aug. 16, 1960

United States Patent Office

2,949,481

PRODUCTION OF ALKYL HALOSILANES BY REACTING SILICATES WITH ALKYL ALUMINUM HALIDES

Robert Craig Anderson, Largs, and Geoffrey John Sleddon, Seamill, Scotland, assignors to Imperial Chemical Industries Limited, London, England, a corporation of Great Britain No Drawing. Filed Sept. 30, 1957, Ser. No. 686,834

Claims priority, application Great Britain Aug. 16, 1957

16 Claims. (Cl. 260—448.2)

This invention relates to a new and improved method for the production of organo-silicon compounds and more partciularly for the production of alkyl silanes and alkyl halo-silanes.

Organo-silicon compounds such as the alkyl silanes and alkyl halo-silanes can be prepared by various methods such as e.g. direct reaction of silicon with an alkyl halide or reaction of silicon halides with Grignard reagents. It has also been proposed to prepare such compounds by alkylating silicon tetrafluoride with aluminium/alkyls. Another method which has been proposed is to react a silane with an olefine while a further method proposed for preparing these compounds is to react silica with a dibutyl ether solution of ethyl magnesium bromide.

According to the present invention a new and improved process for the production of alkyl silanes or alkyl halo-silanes comprises reacting together a silicate and an alkyl aluminium halide of the general formula $R_aR'_bAlX_{3-a-b}$ where R and R' are alkyl groups, X is a halogen, $a$ is 1 or 2, $b$ is 0 or 1 and $a+b=1$ or 2.

Silicates suitable for use in the process of our invention include natural and synthetic silicates such as bentonite, talc, china clay, albite felspar, olivine, wollastonite, mica, chrysotile asbestos, commercial anhydrous sodium silicates and the like. Materials of high specific surface area are preferred as they are normally more reactive. It is also normally preferred to dry the silicate by heating prior to use as this gives an appreciably increased yield.

The alkyl aluminium halides, which may be used are preferably those in which R and R' are methyl or ethyl groups. Other alkyl groups such as propyl or butyl may also be used. In such cases, however, the reaction is accompanied by the production of olefinic by-products. The halogen group X may be chlorine, bromine, fluorine or iodine. It is, however, preferred to use chlorides or bromides. Suitable alkyl aluminium halides include methyl aluminium dichloride, methyl aluminium sesquichloride, dimethyl aluminium chloride, dimethyl aluminium iodide, ethyl aluminium sesquichloride, ethyl aluminium sesquibromide, and ethyl aluminium sesquiiodide. In addition to the alkyl aluminium halide the reaction mixture may also contain one or more aluminium trialkyls and/or one or more aluminium halides. The alkyl aluminium halide may, if desired, be formed in situ by the reaction of an alkyl halide and aluminium and in this case it is sometimes preferable to use a catalyst to initiate or accelerate the reaction. Suitable catalysts include for example copper and copper alloys, aluminium halides such as aluminium chloride, alkyl aluminium halides, compound aluminium halides and the like.

The relative proportions of the silicate and the alkyl aluminium halide used in the process of our invention may vary within wide limits. For most purposes proportions giving a molar ratio of Si:Al of from 1:2 to 4:1 are eminently satisfactory. It is, however, preferred to operate within the range 1:1 to 2:1.

The reaction is normally preferably carried out by heating the reactants together under pressure which may be the autogenous pressure generated at the temperature of reaction. The reaction may however also be carried out under atmospheric or subatmospheric pressures. Normally the reaction proceeds more quickly at higher pressures and more slowly at lower pressures so much so that in some cases the rate of reaction of specific reactants is too slow at low pressures to be suitable for commercial operation. In certain cases, however, e.g. using alkyl aluminium halides liable to decompose at high temperatures such as certain of the bromides low pressure operation may be advantageous. The heating may be within the temperature range 125–500° C. but is preferably within the range 200–330° C. In many cases it is convenient to carry out the reaction batchwise. It is, however, also possible to operate in a continuous manner.

Normally it is preferred to carry out the reaction in the absence of any solvent. If desired, however, a solvent can be included in the reaction mixture. Suitable solvents include high boiling hydrocarbons.

The time required for reaction will, of course, depend on the reactivity of the silicate used and on the temperature of the reaction. Normally times of the order of 2 to 14 hours are sufficient.

Our invention is further illustrated by the following examples in which all parts and percentages are by weight.

*Example 1*

A reaction vessel was charged with 18 parts of dried bentonite containing 70% silica and 9 parts ground scrap aluminium alloy containing 91% aluminium. The mixture was heated and stirred at 275° C. and methyl chloride passed therethrough at a rate of 2.3 parts per hour. 0.50 part of sublimed anhydrous aluminium chloride was introduced into the reaction mixture initially to act as a catalyst. After 17 hours, a reaction product consisting of 6.2 parts of organosilicon compounds was obtained. This mixture consisted of 1% tetramethylsilane, 11% dimethylchlorsilane, 30% trimethylchlorsilane and 8% dimethyldichlorsilane.

*Example 2*

10 parts of dried bentonite of size less than 200 B.S. mesh and containing 67.3% of silica were reacted with 10.5 parts of ethyl aluminium sesquichloride by heating at a temperature of 305° C. for 16 hours in a glass-lined pressure vessel which had been flushed with nitrogen before use. The contents of the reactor were cooled to −70° C. and the pressure released. The reaction mixture was thereafter extracted with dry pentane to yield a reaction product consisting of 4.2 parts of a pale yellow oil. This oil was found on analysis to contain 55% triethylchlorsilane, 26% diethyldichlorsilane, 3% ethylmethyldichlorsilane and 16% diethylmethylchlorsilane.

*Example 3*

10 parts of dried bentonite and 16 parts of ethyl aluminium sesquichloride were reacted in the manner described in Example 2. The reaction product consisted of 4.8 parts of a pale yellow liquid containing 41% triethylchlorsilane, 29% diethyldichlorsilane, 6% ethylmethyldichlorsilane and 23% diethylmethylchlorsilane.

*Example 4*

10 parts of dried bentonite and 10.7 parts of ethyl aluminium sesquichloride were reacted in a manner similar to that of Example 2 at a temperature of 330° C. for 15 hours. The reaction mixture was thereafter cooled and distilled under reduced pressure. 3.6 parts of a yellow oil consisting of 36.4% triethylchlorsilane, 46.6% diethyldichlorsilane, 11.5% diethylmethylchlorsilane and 5.6% ethylmethyldichlorsilane were obtained.

*Example 5*

10 parts of dried bentonite and 11 parts of methyl aluminium sesquichloride were reacted together for 6 hours at 300° C. in a manner similar to that described in Example 4. On distillation 3.7 parts of an oil consisting of 22% tetramethylsilane, 70% trimethylchlorsilane and 8% dimethyldichlorsilane with traces of dimethylchlorsilane and trimethylsilane were obtained.

*Example 6*

10 parts of dried bentonite and 15.2 parts of ethyl aluminium sesquibromide were reacted at 315° C. for 15 hours in the manner described in Example 2. 3.2 parts of a liquid consisting of 40% tetraethylsilane with a mixture of ethylbromosilanes were obtained.

*Example 7*

10 parts of dried china clay of silica content 51.2% and 11.9 parts of ethyl aluminium sesquichloride were reacted together in the manner described in Example 4 for a period of 6 hours at a temperature of 300°. 3.75 parts of a liquid consisting of 34.3% triethylchlorsilane, 52.2% diethyldichlorsilane, 8% diethylmethylchlorsilane and 5.2% of ethylmethyldichlorsilane were obtained.

*Example 8*

10 parts of dried albite felspar of size less than 120 B.S. mesh and 10.5 parts of ethyl aluminium sesquichloride were reacted together in the manner described in Example 13 at a temperature of 305° C. for 15 hours. The product obtained consisted of 2.1 parts of a mixture containing 10% triethylchlorsilane, 4% diethyldichlorsilane, 68% tetraethylsilane and 18% triethylmethylsilane.

*Example 9*

10 parts of dried asbestos powder (analytical grade) and 16.2 parts of ethyl aluminium sesquichloride were reacted together in the manner described in Example 2 at a temperature of 305° C. for 15 hours. 3.6 parts of product consisting almost entirely of tetraethylsilane were obtained together with 2 parts of unreacted ethyl aluminium sesquichloride.

*Example 10*

10 parts of dried muscovite mica and 15.6 parts of ethyl aluminium sesquichloride were reacted together at 305° C. for 15 hours in the manner described in Example 4. 1.4 parts of product consisting of 90% tetraethylsilane and 10% triethylchlorsilane were obtained.

*Example 11*

5 parts of dried talc were reacted with 10.5 parts of ethyl aluminium sesquichloride in the manner described in Example 10. 1.5 parts of a product consisting almost entirely of tetraethylsilane were obtained.

*Example 12*

10 parts of dried tripoli powder and 10.5 g. of ethyl aluminium sesquichloride were reacted together in the manner described in Example 5 for a period of 3 hours at a temperature of 305° C. 3.1 parts of a mixture of ethylchlorsilanes were obtained.

*Example 13*

20 parts of dried bentonite were reacted by heating under reflux with 87 parts of ethyl aluminium sesquibromide. Heating was continued for 12 hours during which time liquid refluxing at 150° C. was removed intermittently from the stillhead. 8.5 parts of product were obtained in this manner and found to consist of 90% tetraethylsilane, 6% triethylmethylsilane and 4% triethylsilane.

What we claim is:

1. A process for the production of alkyl- and alkyl halo-silanes comprising reacting together an inorganic silicate selected from the group consisting of bentonite, talc, china clay, albite felspar, olivine, wollastonite, mica, chrysotile asbestos, and sodium silicate, and an alkyl aluminum halide of the general formula $R_aR'_bAlX_{3-a-b}$ where R and R' are alkyl groups, X is a halogen, $a$ is an integer of from 1 to 2, $b$ is an integer of from 0 to 1 and $a+b$ is an integer of from 1 to 2.

2. A process according to claim 1 wherein the silicate is of high specific surface area.

3. A process according to claim 1 wherein the silicate is dried by heating prior to use.

4. A process according to claim 1 wherein the alkyl aluminium halide is a compound selected from the group consisting of methyl and ethyl aluminium halide.

5. A process according to claim 1 wherein the reaction mixture also contains at least one aluminium trialkyl.

6. A process according to claim 1 wherein the reaction mixture also contains at least one aluminium halide.

7. A process according to claim 1 wherein the alkyl aluminium halide is formed in situ by the reaction of an alkyl halide and aluminium.

8. A process according to claim 7 wherein a small proportion of an initiating catalyst is added to the reaction mixture.

9. A process according to claim 1 wherein the molar proportion of silicon to aluminium is from 1:2 to 4:1.

10. A process according to claim 9 wherein the ratio is from 1:1 to 2:1.

11. A process according to claim 1 wherein the reactants are heated together under pressure.

12. A process according to claim 11 wherein the pressure is the autogenous pressure generated at the temperature of reaction.

13. A process according to claim 1 in which the reaction is carried out under atmospheric pressure.

14. A process according to claim 1 in which the reaction is carried out at sub-atmospheric pressures.

15. A process according to claim 1 wherein the reaction is carried out at a temperature within the range 125 to 500° C.

16. A process according to claim 15 wherein the temperature range is from 200 to 330° C.

References Cited in the file of this patent

Jenkner: German application Ser. No. K18,391, printed February 2, 1956 (Kl. 120 26/03) (2 pp. spec., no dwg.).

Jenkner et al.: German application Ser. No. K18,392, printed April 19, 1956 (Kl. 120 26/03) (2 pp. spec., no dwg.).